(12) United States Patent
Helander

(10) Patent No.: US 8,156,500 B2
(45) Date of Patent: Apr. 10, 2012

(54) REAL-TIME SELF TUNING OF PLANNED ACTIONS IN A DISTRIBUTED ENVIRONMENT

(75) Inventor: Johannes Helander, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1640 days.

(21) Appl. No.: 11/173,433

(22) Filed: Jul. 1, 2005

(65) Prior Publication Data

US 2007/0011683 A1 Jan. 11, 2007

(51) Int. Cl.
*G06F 9/46* (2006.01)
*G06F 15/173* (2006.01)
*G06F 9/45* (2006.01)

(52) U.S. Cl. ........... 718/104; 718/105; 709/226; 703/22
(58) Field of Classification Search .................. 709/223; 718/102
See application file for complete search history.

(56) References Cited

U.S. PATENT DOCUMENTS

| | | | | |
|---|---|---|---|---|
| 5,640,595 | A * | 6/1997 | Baugher et al. | 710/10 |
| 6,282,561 | B1 * | 8/2001 | Jones et al. | 718/104 |
| 6,341,303 | B1 * | 1/2002 | Rhee et al. | 718/104 |
| 6,539,445 | B1 * | 3/2003 | Krum | 710/110 |
| 6,584,489 | B1 * | 6/2003 | Jones et al. | 718/104 |
| 6,785,889 | B1 * | 8/2004 | Williams | 718/104 |
| 7,065,764 | B1 * | 6/2006 | Prael et al. | 718/102 |
| 7,117,411 | B2 * | 10/2006 | McNeely et al. | 714/724 |
| 7,454,754 | B2 * | 11/2008 | Tajima | 718/104 |
| 7,472,159 | B2 * | 12/2008 | Freimuth et al. | 709/203 |
| 7,610,225 | B2 * | 10/2009 | O'Neill | 705/30 |
| 7,620,953 | B1 * | 11/2009 | Tene et al. | 718/104 |
| 7,729,307 | B2 * | 6/2010 | Legg | 370/329 |
| 2003/0061260 | A1 * | 3/2003 | Rajkumar | 709/104 |
| 2004/0064355 | A1 * | 4/2004 | Dorenbosch et al. | 705/9 |
| 2006/0026305 | A1 * | 2/2006 | Illowsky et al. | 710/8 |
| 2006/0218551 | A1 * | 9/2006 | Berstis et al. | 718/102 |
| 2007/0022425 | A1 * | 1/2007 | Jackson | 718/104 |

OTHER PUBLICATIONS

Hardwick et al. "Modeling the Performance of E-Commerce Sites'" 2002.*
Kounev et al. "A Capacity Planning Methdology for Distributed E-Commerce Applications", Jan. 2001.*
Chen et al. "Performance Prediction of COmponent-based Application", Jan. 2005.*
Johannes Helander, Alessandro Forin, "MMLite: A Highly Componentized System Architecture," in the 8th ACM SIGOPS European Workshop, Sep. 1998.

(Continued)

*Primary Examiner* — Meng An
*Assistant Examiner* — Abdullah Al Kawsar
(74) *Attorney, Agent, or Firm* — Lyon & Harr, LLP; Mark A. Watson

(57) ABSTRACT

Automatic programming, scheduling, and control of planned activities at "worker nodes" in a distributed environment are provided by a "real-time self tuner" (RTST). The RTST provides self-tuning of controlled interoperation among an interconnected set of distributed components (i.e., worker nodes) including, for example, home appliances, security systems, lighting, sensor networks, medical electronic devices, wearable computers, robotics, industrial controls, wireless communication systems, audio nets, distributed computers, toys, games, etc. The RTST acts as a centralized "planner" that is either one of the nodes or a dedicated computing device. A set of protocols allow applications to communicate with the nodes, and allow one or more nodes to communicate with each other. Self-tuning of the interoperation and scheduling of tasks to be performed at each node uses an on-line sampling driven statistical model and predefined node "behavior patterns" to predict and manage resource requirements needed by each node for completing assigned tasks.

15 Claims, 5 Drawing Sheets

OTHER PUBLICATIONS

Alessandro Forin, Johannes Helander, Paul Pham, Jagadeeswaran Rajendiran, "Component Based Invisible Computing," in the 3rd IEEE/IEE Real-Time Embedded Systems Workshop, London, Dec. 2001.

Johannes Helander, Yong Xiong, "Secure Web Services for Low-Cost Devices", in 8th IEEE International Symposium on Object-oriented Real-time distributed Computing May 18-20, 2005, Seattle, Washington.

K. H. (Kane) Kim, "Basic Programming Structures for Avoiding Priority Inversions", in Proceedings of ISORC03, Vienna, Austria 2003.

Michael B. Jones, Daniela Roçu, Marcel-Catalin Roçu, "CPU Reservations and Time Constraints: Efficient Predictable Scheduling of Independent Activities", in Symposium of Operating System Principles, St-Malo, France, 1997.

K. L. Krause, V. Y. Chen, H.D. Schwetman, "A task-scheduling algorithm for a multiprogramming computer system", in ACM symposium of Operating system principles, New York, USA, 1973.

"Web Services Architecture-W3C® Aug. 8, 2003," .w3.org/TR/ws-arch/.

"Using XML Web Services (SOAP) Simple Object Access Protocol (SOAP) 1.1—W3C® Note May 8, 2000," .w3.org/TR/SOAP/.

"SOAP Version 1.2 Part 1: Messaging Framework—W3C® Recommendation Jun. 24, 2003," .w3.org/TR/soap12-part1/.

* cited by examiner

REAL-TIME SELF TUNING OF PLANNED ACTIONS IN A DISTRIBUTED ENVIRONMENT

BACKGROUND

1. Technical Field

The invention is related to embedded real-time computing systems, and in particular, to automatic self tuning of real-time scheduling and control of interoperation among a plurality distributed real-time components.

2. Related Art

As semiconductor technology becomes more mature and inexpensive, it becomes feasible to add computing and/or communication capabilities to many devices that used to be mechanical or analog, and to come up with new devices entirely. Computing that enhances existing everyday devices and makes them smarter without requiring extra human interaction is conventionally referred to as "invisible computing." In this domain the computer is not the main focus but rather the device itself or the specialized function it performs.

For example, devices used in "invisible computing" environments include embedded control systems, including consumer devices, intelligent sensors and smart home controls; communication-oriented devices such as digital cell phones and networking infrastructure; programmable peripherals and microcontrollers, home appliances, toys, games, etc. In all these cases, the devices typically include inexpensive microprocessors, such as a DSP, a VLIW, or a micro-controller rather than a general-purpose computing capability or platform (such as a PC-type computer). One problem with such devices, relative to a general-purpose computing platform is that the available system memory is typically severely restricted; there might be no MMU; and network connections might be sporadic. However, given these limitations, there is still an essential requirement for real-time interoperability, operation, and control.

Invisible computing differs from personal computing mainly because the user interface is not screen and keyboard based, and resources (such as energy, memory, bandwidth, etc.) are often severely restricted. While a PC or workstation can use a general-purpose operating system (a collection of commonly needed features) an invisible computer can seldom afford such luxury because of its severely constrained resources. Consequently, software controlling such devices is generally specifically tailored to the specific applications that are to be performed by such devices.

Invisible computing is also slightly different from traditional embedded computing in that the devices are most often communicating with each other and/or with general-purpose computers (via either wired or wireless connections) acting as a central controller/scheduler, and have a limited power supply.

Limited resource, semi-intelligent devices found in invisible computing environments can perform rudimentary tasks autonomously. It is the ability to communicate with other invisible devices that gives them added capabilities, such that the value of the whole system is greater than the sum of its parts.

When the small devices have the ability to communicate with PCs or other "big machines" in addition to other peers, it is possible to leverage the advantages of invisible computing in desktop computing and vice versa. PCs can provide back-end processing for small devices, and small devices can extend the reach of a traditional PC further into our everyday lives. For example, a small device can access a database on a web server; a PC can provide a user interface for examining and analyzing sensor data in a home; etc.

One area where conventional invisible computing environments are lacking deals with the ability to handle concurrent tasks given limited resources. For example, one common solution for handling concurrent tasks spread among two or more devices is to provide a proportional time schedule that simply reserves x % of the CPU cycles [or bandwidth] in y-second intervals for particular devices. Conventional "constraint-based scheduling" (CBS) techniques and related "earliest deadline first" (EDF) techniques have also been used for handling concurrent computational tasks given limited resources.

For example, one conventional invisible computing system, termed "MMLite" provides a constraint-based real-time scheduler with feedback to dispatch threads. The programmer dynamically provides the scheduler with information about the time constraints under which a certain section of code is to be executed. The scheduler will make sure that the thread is scheduled before the given deadline with enough projected time to complete the indicated computing. To prevent priority inversion, the currently running thread's constraints are inherited by other threads that might block it. However, as with the previous example, the constraint scheduler schedules threads in a time-sharing fashion. Time-sharing is internally implemented using artificial constraints. Threads that specify time constraints are given priority over all time-sharing threads. Unfortunately, while such solutions are generally sufficient for simple application behaviors, they cannot effectively deal with: 1) a mix of repetitive and one-time jobs; and 2) cases where the work needs to be done within a constrained sub-interval, including both temporal and spatial issues.

Similar ideas exist with respect to industrial quality controls. For instance, in an example of automated automobile manufacturing, an assembly line stops for 10 seconds every minute. Robotic welding of a door handle takes 4 seconds. Seemingly, this is plenty of time to complete the welding task. However, if the robot welds a door handle outside the correct time window, it might destroy the car. Consequently, the proportional time schedule noted above would not work by itself. Therefore, in this case, various sensors typically ensure that the car is in the correct position for the door handle to be welded so as to avoid costly errors. Unfortunately, because checks need to be made as to correct handle position prior to every welding operation, advance planning and resource sharing becomes a more difficult proposition. Consequently, conventional industrial quality control methods are not readily adaptable for use in real-time control and scheduling of distributed devices connected in an ad-hoc network environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embedded real-time computing systems for entertainment and other consumer, or industrial, uses are increasingly built out of distributed components that are manufactured by multiple vendors. This means that in an "invisible computing" environment, interoperation between such components is an important factor. Unfortunately, meeting real-time predictability standards becomes ever harder as the devices get more diverse and increase in number, and as the number of temporal uncertainties in the interaction between devices increases.

To address these and other issues, a "real-time self-tuner" (RTST), as described herein, provides automatic programming, scheduling, and real-time control of desired activities/ tasks performed by "worker nodes" in an ad-hoc distributed environment as a function of available resources and task criticality. Consequently, the RTST acts, in part, as a centralized "planner" that is either instantiated in one of the nodes or operates as a part of a general-purpose or a dedicated computing device, depending upon the computing capabilities of the various modes. A set of communications protocols allow applications to communicate with the nodes, and allow one or more nodes to communicate with each other, if needed. Self-tuning of the interoperation and scheduling of tasks to be performed at each node uses an on-line sampling driven statistical model and predefined node "behavior patterns" to predict and manage resource requirements needed by each node for completing assigned tasks, so as to maximize resource usage across the range of devices competing for those resources.

The programming, scheduling, and real-time control provided by the RTST is generally provided as a function of statistical observations of real-world behavior of the worker nodes relative to predefined "behavior patterns" of those nodes, and with respect to a finite amount of available shared resources (CPU cycles, memory, I/O bandwidth, capabilities of the various nodes, etc.). Since there is generally a finite pool of shared resources, the RTST acts to dynamically plan and schedule actions or activities by the worker nodes in such a way as to ensure that resource usage by the various worker nodes does not exceed the available resources. In otherwords, the RTST observes what is happening, relative to particular worker nodes, and then automatically plans actions or tasks to be performed by the worker nodes depending upon a criticality of the particular tasks given the available resources.

The "worker nodes" described herein generally include any device or application capable of real world interaction, and include both "producers" and "consumers" of data. These worker nodes include devices, such as, for example, home appliances, security systems, lighting, sensor networks, medical electronic devices, wearable computers, robotics, industrial controls, wired or wireless communication systems, audio nets, distributed computers, toys, games, etc.

Further, each worker node includes at least a minimum computational capability to respond to basic commands, and to perform assigned tasks, when ordered. Such computational capability can be provided by inexpensive conventional microcontrollers (costing on the order of only a few dollars each), including, for example, DSP's, VLIWs, or other microcontrollers, depending upon the particular device. However, the devices comprising the worker nodes may include greater computational capability, such as in the case where a particular node is a PC-type computer, or some more powerful computing platform, and in fact, the nodes can form a distributed computing environment made of computers of various computing capabilities.

In general, producer nodes produce data, and consumer nodes consume data. For example, a producer node might include a sensor, such as a thermocouple, an accelerometer, etc., a device which generates data, such as a CD player, a camera, etc., or some type of control device, such as a stereo remote control, a light switch, a power on/off button, etc. In contrast, a consumer node might include a data recorder, a receiver and/or stereo speakers, a light fixture, a video display device, etc. In other words, as noted above, the producer node generates data while the consumer node makes use of that data or in some way acts on that data. Consequently, producer/consumer pairs may include matched pairs of nodes, such as, for example, a light switch/light fixture pair, a music player paired with a receiver/speaker, a data sensor/data recorder pair, etc., to name only a few such pairs.

In addition to worker nodes, the overall system enabled by the RTST also includes one or more "instigators" and one or more "planners." An instigator, as defined herein, is any application or device that drives a task that is to be performed by a worker node. For example, an instigator might be a TV remote control device that is pressed to start a movie on a television (a worker node in this example), or a computer program that orders a particular device or application to perform a particular task. Instigators do not directly control the worker nodes, but instead act through one or more "planners," with the planner itself being responsible for scheduling the actions of the worker nodes in response to a request from an instigator, and relative to available resources.

It should be noted that the planner itself can act as an instigator, as described in further detail herein. Further, it should also be noted that (via the corresponding planner) one task can trigger another different task, or one instance of a particular task can trigger the next instance of that task. For example, lights (consumer node) can be automatically dimmed (task) by a light switch (producer node) while a particular song is played (task) by a receiver/speaker (consumer node) sent from a music player (producer node) all under the control of one or more planners.

In scheduling the tasks to be performed by the worker nodes, the planner evaluates a "behavior pattern" that is defined for each of the worker nodes. In general, these behavior patterns include information that identifies parameters, such as, for example, what sequence of actions is needed, what messages are expected, what types of resources are required for a particular worker node to execute a task, and how much temporal tolerance exists in performing a particular task (for use in determining earliest and latest start times relative to a task deadline).

In various embodiments, these behavior patterns are either hand authored, automatically determined by experimentation, or are defined using a software wizard, or the like, which evaluates individual worker nodes to estimate their behavior, either with or without user input. In general, behavior patterns can be maintained either within some addressable memory within each corresponding node, in an external lookup table, file, or database accessible to the instigators and/or planners, or can be maintained within some memory accessible to the corresponding planner.

With respect to experimental determination of behavior patterns, the general idea is to perform a "dry run" of particular tasks across the ad-hoc network to determine what resources are actually consumed by the worker nodes in performing those tasks. These dry-runs are preferably performed without actually affecting anything in the real world (audibly playing music, visibly cycling lights, recording data to a memory device, etc.). A simple example of a "dry run" would be to send audio packets across a network from a music player to one or more sets of receivers/speakers (without actually audibly playing the music) to determine behaviors such as, for example, how many concurrent audio streams the music player can service, how much network bandwidth is consumed by the audio packets for each stream, how much bandwidth is available, the maximum data rate that can be handled by the receivers/speakers, etc.

Given the behavior patterns for each worker node, the planner acts to instantiate the behavioral pattern into a spatial and temporal plan given a task that is requested by the instigator. In general, the planner derives a specific action and resource plan for each node that is needed to execute a particular task (with each task being an instance of the corresponding behavior pattern). The planner then negotiates the resources with each node and orders particular tasks to begin at particular times, relative to the available resources and a predefined criticality of the task (e.g., a heart pacemaker monitor would likely have a higher criticality than an audio data stream from a music player, as would be defined in the corresponding behavior patterns). Further, in a tested embodiment, the planner also ensures that there are no resource or node usage conflicts between the tasks when negotiating resources for each node.

In a tested embodiment, the self-tuning planning capabilities of the RTST described herein were implemented using a novel adaptation of open standards based XML Web Services (i.e., Simple Object Access Protocol, "SOAP") both for application and for system communication in order to maximize interoperability. Consequently, for purposes of explanation, the RTST will be generally described herein in the context of an XML-based SOAP implementation. However, it should be clear that the capabilities and features described herein can be implemented with any desired scripting or coding language, and it is not intended to be limited to the use of an XML-based SOAP implementation.

In view of the above summary, it is clear that in various embodiments, the RTST described herein provides a unique system and method for automatic programming, scheduling, and real-time control of tasks performed by worker nodes in an ad-hoc distributed environment as a function of available resources and task criticality. Other advantages of the RTST will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following detailed description, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
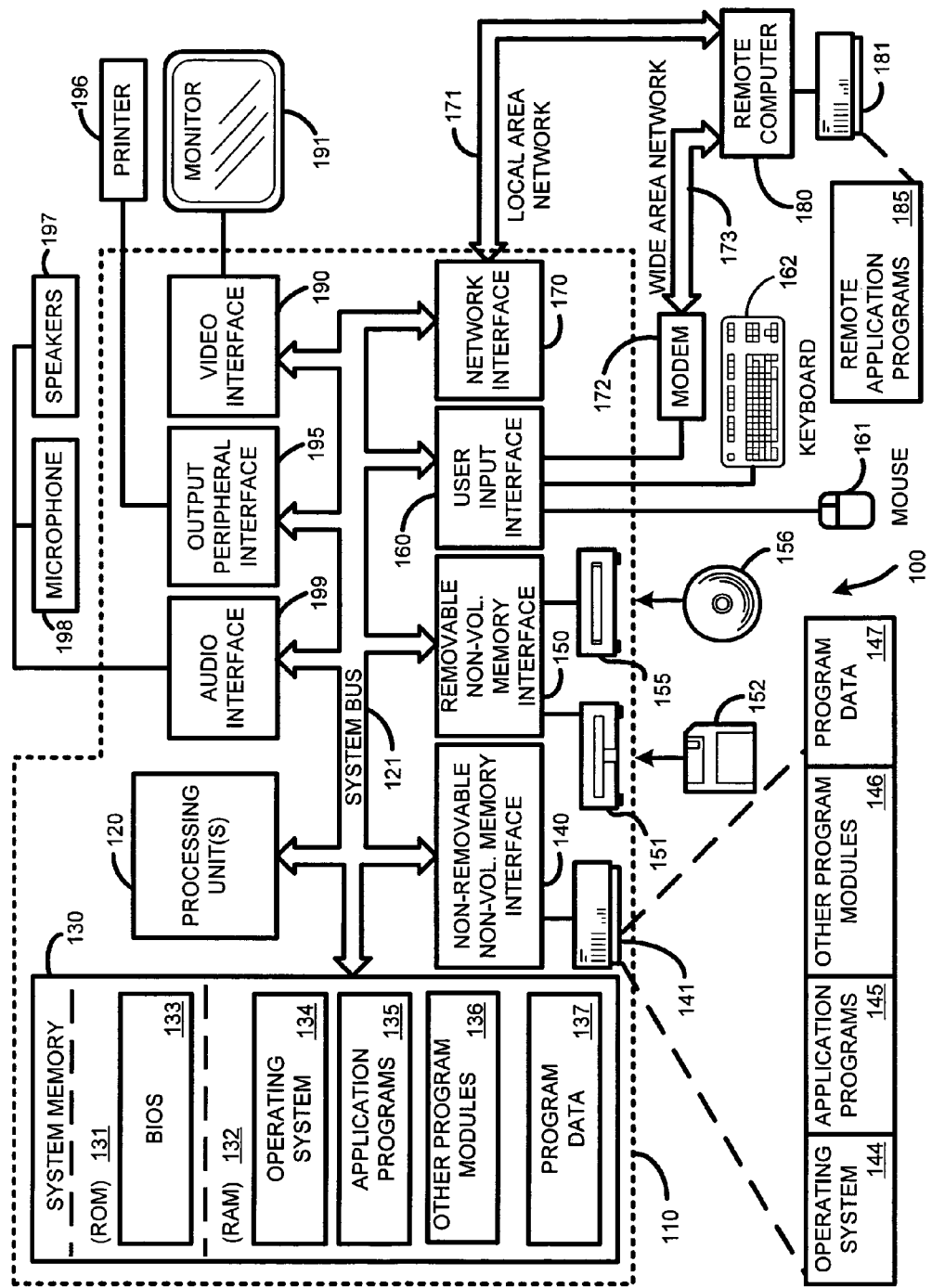
FIG. 1 is a general system diagram depicting a general-purpose computing device for use as any or all of a worker node, instigator, or planner for automatic programming, scheduling, and real-time control of tasks performed under the control of a "real-time self tuner" (RTST).
Figure 2:
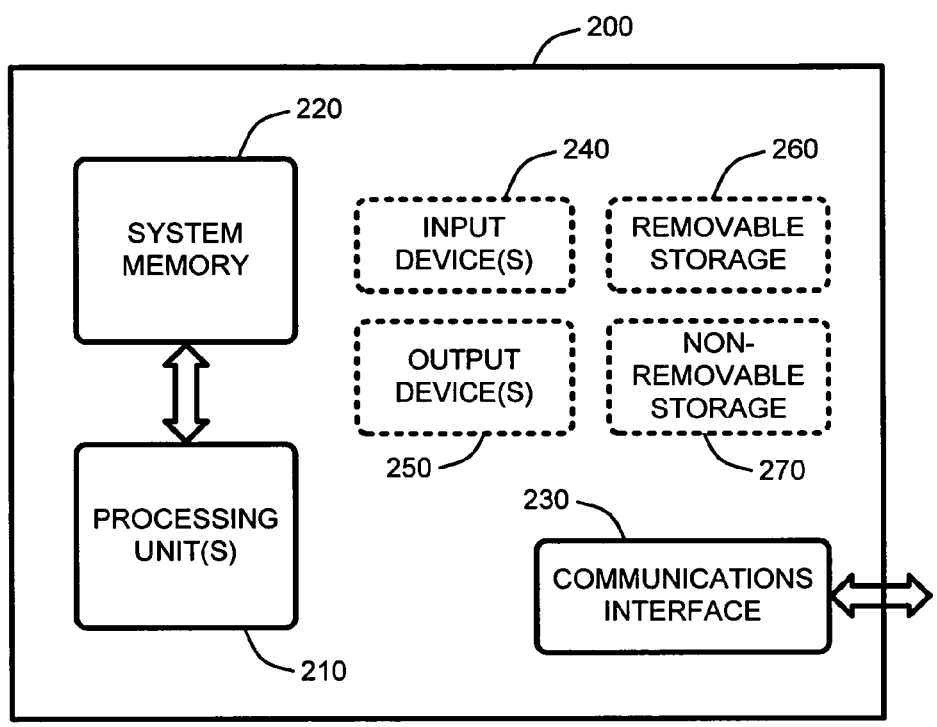
FIG. 2 is a general system diagram depicting a general device having simplified computing and I/O capabilities for use as any or all of a worker node, instigator, or planner.

1.0 Exemplary Operating Environments:

FIG. 1 and FIG. 2 illustrate two examples of suitable computing environments on which various embodiments and elements of a "real-time self tuner" (RTST), as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The RTST is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices. Particular "worker nodes," as described in further detail below, may also include devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, processing unit(s) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

In addition, the computer 110 may also include a speech input device, such as a microphone 198 or a microphone array, as well as a loudspeaker 197 or other sound output device connected via an audio interface 199. Other input devices (not shown) may include a joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc. It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a device to act as a worker node (as described in further detail below), the device must have some minimum computational capability and a communications interface. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). Finally, the simplified computing device of FIG. 2 may also removable and/or non-removable storage, 260 and 270, respectively (analogous to the storage devices described with respect to FIG. 1).

The exemplary operating environments having now been discussed, the remaining part of this description will be devoted to a discussion of the program modules and processes embodying the "real-time self tuner" (RTST).

2.0 Introduction:

Computing that enhances existing everyday devices and makes them smarter without requiring extra human interaction is conventionally referred to as "invisible computing." Embedded real-time computing systems for entertainment and other consumer, or industrial, uses are increasingly built out of distributed components that are manufactured by multiple vendors. This means that in an "invisible computing" environment, interoperation between such components is an important factor. Consequently, a "real-time self-tuner" (RTST), as described herein, provides automatic programming, scheduling, and real-time control of desired activities/tasks performed by "worker nodes" in an ad-hoc distributed environment as a function of available resources and task criticality. These worker nodes include devices, such as, for example, general purpose computer systems, home appliances, security systems, lighting, sensor networks, medical electronic devices, wearable computers, robotics, industrial controls, wired and wireless communication systems, audio nets, distributed computers, toys, games, etc.

The RTST acts, in part, as a centralized "planner" that is either instantiated in one of the nodes or operates as a part of a general-purpose or a dedicated computing device. A set of communications protocols allows applications to communicate with the nodes, and allow one or more nodes to communicate with each other, if needed. Self-tuning of the interoperation and scheduling of tasks to be performed at each node uses an on-line sampling driven statistical model and predefined node "behavior patterns" to predict and manage resource requirements needed by each node for completing assigned tasks, so as to maximize resource usage across the range of devices competing for those resources.

In a tested embodiment, the self-tuning planning capabilities of the RTST described herein were implemented using a novel adaptation of open standards based XML Web Services (i.e., Simple Object Access Protocol, "SOAP") both for application and for system communication in order to maximize interoperability. Consequently, for purposes of explanation, the RTST will be generally described herein in the context of an XML-based SOAP implementation. However, it should be clear that the capabilities and features described herein can be implemented with any desired scripting or coding language, and it is not intended to be limited to the use of an XML-based SOAP implementation.

2.1 System Overview:

The programming, scheduling, and real-time control provided by the RTST is generally provided as a function of statistical observations of real-world behavior of the worker nodes relative to predefined "behavior patterns" of those nodes, and with respect to a finite amount of available shared resources (CPU cycles, memory, I/O bandwidth, capabilities of the various nodes, etc.). Since there is generally a finite pool of shared resources, the RTST acts to dynamically plan and schedule actions or activities by the worker nodes in such a way as to ensure that resource usage by the various worker nodes does not exceed the available resources. In other words, the RTST observes what is happening, relative to particular worker nodes, and then automatically plans actions or tasks to be performed by the worker nodes depending upon a criticality of the particular tasks given the available resources.

The "worker nodes" described herein generally include any device or application capable of real world interaction, and include both "producers" and "consumers" of data. These worker nodes include devices, such as, for example, home appliances, security systems, lighting, sensor networks, medical electronic devices, wearable computers, robotics, industrial controls, wired or wireless communication systems, audio nets, distributed computers, toys, games, etc.

Further, each worker node includes at least a minimum computational capability to respond to basic commands, and to perform assigned tasks, when ordered. Such computational capability can be provided by inexpensive conventional microcontrollers (costing on the order of only a few dollars each), including, for example, DSP's, VLIWs, or other microcontrollers, depending upon the particular device. However, the devices comprising the worker nodes may include greater computational capability, such as in the case where a particular node is a PC-type computer, or some more powerful computing platform, and in fact, the nodes can form a distributed computing environment made of computers of various computing capabilities.

In general, producer nodes produce data, and consumer nodes consume data. For example, a producer node might include a sensor, such as a thermocouple, an accelerometer, etc., a device which generates data, such as a CD player, a camera, etc., or some type of control device, such as a stereo remote control, a light switch, a power on/off button, etc. In contrast, a consumer node might include a data recorder, a receiver and/or stereo speakers, a light fixture, a video display device, etc. In other words, as noted above, the producer node generates data while the consumer node makes use of that data or in some way acts on that data. Consequently, producer/consumer pairs may include matched pairs of nodes, such as, for example, a light switch/light fixture pair, a music player paired with a receiver/speaker, a data sensor/data recorder pair, etc., to name only a few such pairs.

In addition to worker nodes, the overall system enabled by the RTST also includes one or more "instigators" and one or more "planners." An instigator, as defined herein, is any application or device that drives a task that is to be performed by a worker node. For example, an instigator might be a TV remote control device that is pressed to start a movie on a television (a worker node in this example), or a computer program that orders a particular device or application to perform a particular task. Instigators do not directly control the worker nodes, but instead act through one or more "planners," with the planner itself being responsible for scheduling the actions of the worker nodes in response to a request from an instigator, and relative to available resources.

It should be noted that the planner itself can act as an instigator, as described in further detail herein. Further, it should also be noted that (via the corresponding planner) one task can trigger another different task, or one instance of a particular task can trigger the next instance of that task. For example, lights (consumer node) can be automatically dimmed (task) by a light switch (producer node) while a particular song is played (task) by a receiver/speaker (consumer node) sent from a music player (producer node) all under the control of one or more planners.

In scheduling the tasks to be performed by the worker nodes, the planner evaluates a "behavior pattern" that is defined for each of the worker nodes. In general, these behavior patterns include information that identifies parameters, such as, for example, what sequence of actions is needed, what messages are expected, what types of resources are required for a particular worker node to execute a task, and how much temporal tolerance exists in performing a particular task (for use in determining earliest and latest start times relative to a task deadline). In various embodiments, these behavior patterns are either hand authored, automatically determined by experimentation, or are defined using a software wizard, or the like, which evaluates individual worker nodes to estimate their behavior, either with or without user input. In general, behavior patterns can be maintained either within some addressable memory within each corresponding node, in an external lookup table, file, or database accessible to the instigators and/or planners, or can be maintained within some memory accessible to the corresponding planner.

With respect to experimental determination of behavior patterns, the general idea is to perform a "dry run" of particular tasks across the ad-hoc network to determine what resources are actually consumed by the worker nodes in performing those tasks. These dry-runs are preferably performed without actually affecting anything in the real world (audibly playing music, visibly cycling lights, recording data to a memory device, etc.). A simple example of a "dry run" would be to send audio packets across a network from a music player to one or more sets of receivers/speakers (without actually audibly playing the music) to determine behaviors such as, for example, how many concurrent audio streams the music player can service, how much network bandwidth is consumed by the audio packets for each stream, how much bandwidth is available, the maximum data rate that can be handled by the receivers/speakers, etc.

Given the behavior patterns for each worker node, the planner then acts to instantiate the behavioral pattern into a spatial and temporal plan given a task that is requested by the instigator. In general, the planner derives a specific action and resource plan for each node that is needed to execute a particular task (with each task being an instance of the corresponding behavior pattern). The planner then negotiates the resources with each node, and orders particular tasks to begin at particular times, relative to the available resources and a predefined criticality of the task (e.g., a heart pacemaker monitor would likely have a higher criticality than an audio data stream from a music player, as would be defined in the corresponding behavior patterns).

Figure 3:
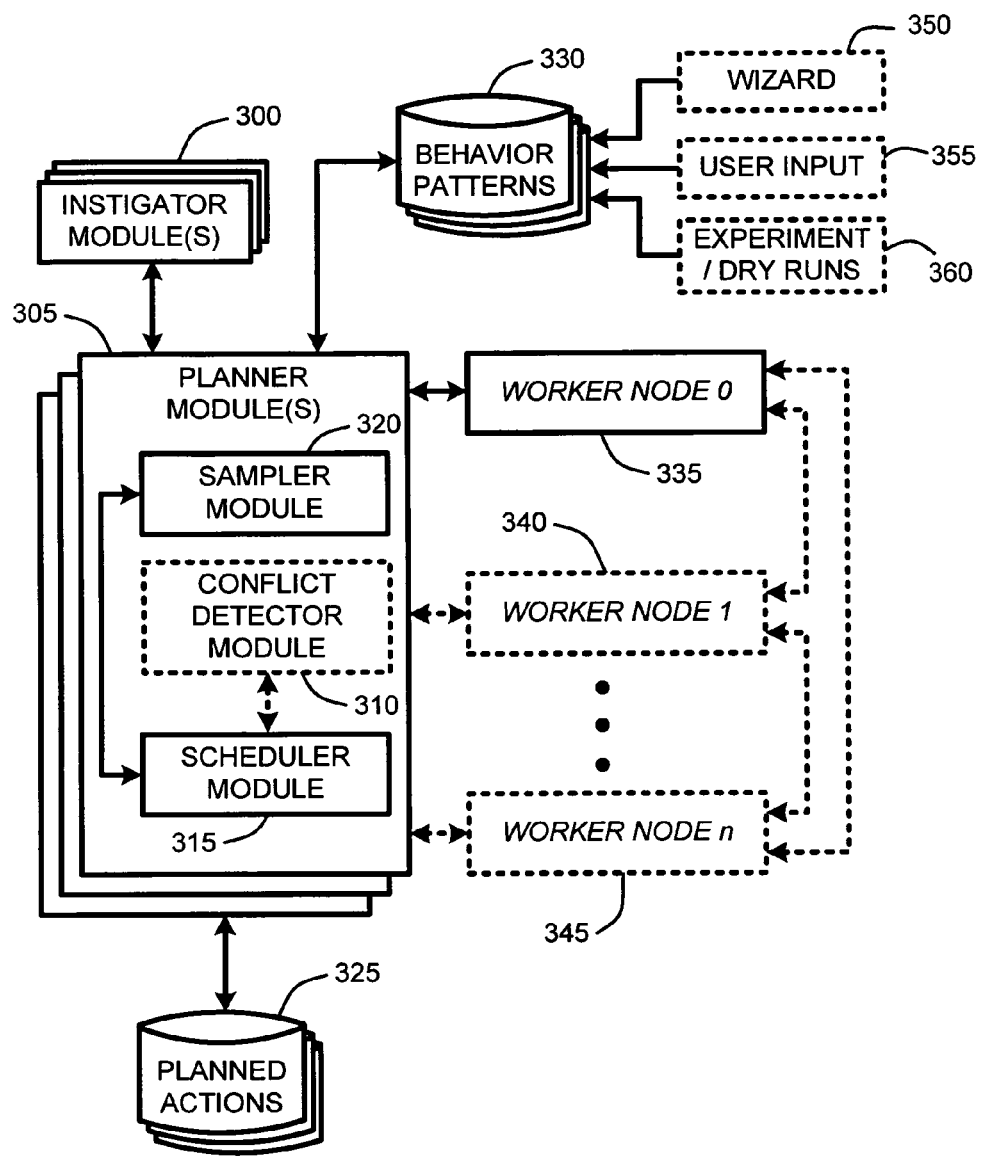
FIG. 3 illustrates an exemplary architectural diagram showing exemplary program modules for providing automatic programming, scheduling, and real-time control of tasks.

2.2 System Architecture:

The processes summarized above are illustrated by the general system diagram of FIG. 3. In particular, the system diagram of FIG. 3 illustrates general interrelationships between program modules for implementing the real-time self tuner (RTST) described herein. It should be noted that any boxes and interconnections between boxes that are represented by broken or dashed lines in FIG. 2 represent alternate embodiments of the RTST described herein, and that any or all of these alternate embodiments, as described below, may be used in combination with other alternate embodiments that are described throughout this document.

Figure 6:
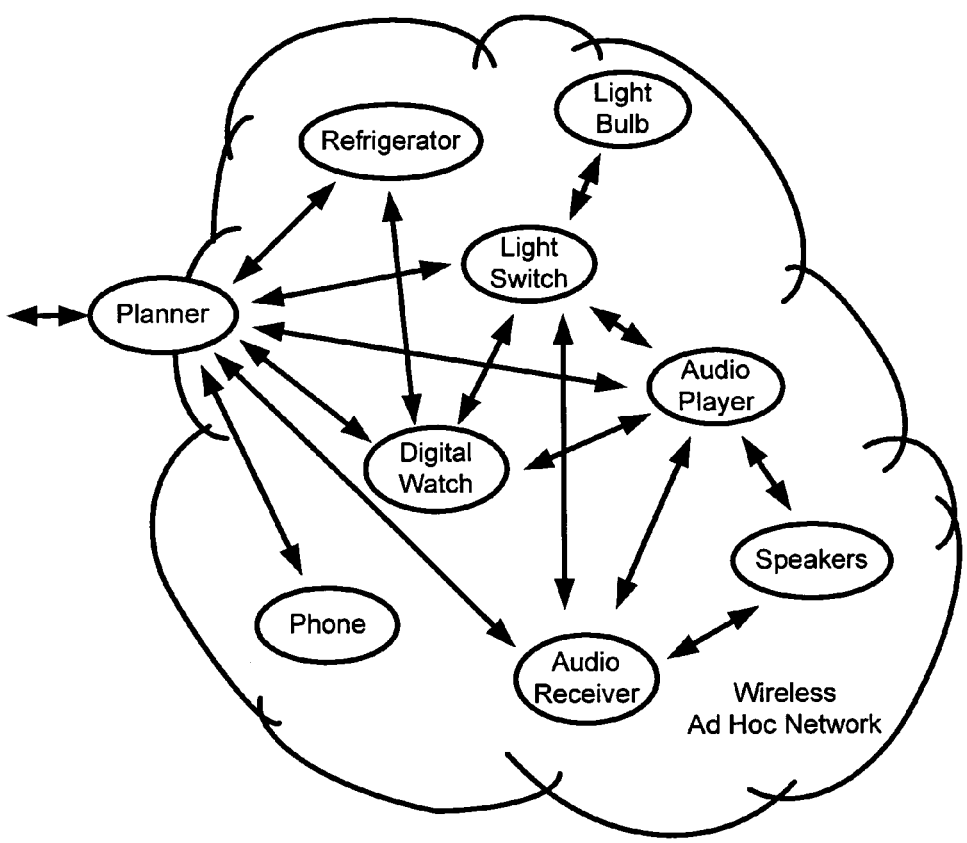
FIG. 6 illustrates an exemplary wireless ad-hoc network comprised of a plurality of variously interconnected computationally enabled devices.

In general, as illustrated by FIG. 3, the RTST system described herein can be instantiated in an ad-hoc distributed network (such as, for example, the ad-hoc network described below with respect to FIG. 6) which includes, at a minimum, one or more planner modules 305, and one or more worker nodes (335, 340 and 345) with corresponding "behavior patterns" 330. The RTST system may also include one or more instigator modules 300. However, the functionality performed by the instigator may be combined with the functionality of the planner in various embodiments of the RTST (depending upon the types and functionality of the devices connected in the ad-hoc network).

In general, as described in greater detail below, the instigator module 300 is any application or device that drives a task that is to be performed by a worker node (335, 340, or 345). One primary function of the instigator modules 300 is to make requests to one or more of the planner modules 305 for a particular task or tasks to be performed. It is then the responsibility of the corresponding planner modules 305 to schedule the requested tasks to be performed by one or more worker nodes (335, 340, or 345). However, as described in further detail below, planner modules 305 can also act in the role of an instigator. Each planner module 305 generally includes an optional conflict detector module 310, a scheduler module 315, and a sampler module 320, as described in further detail below.

In scheduling particular tasks to be performed by the various worker nodes (335, 340, or 345), the planner module 305 first optionally uses the conflict detector module 310 to determine whether a requested task conflicts with an already scheduled task (or other ongoing repetitive actions) based on predefined behavior patterns 330 for each worker node, or whether one of the necessary worker nodes will be unable to perform the requested task for some reason. The conflict detector module 310 then attempts to fill in one-time tasks into any gaps in the current scheduling. When a potential overlap is detected between tasks, any calculated slack between the two tasks is adjusted by reducing some slack from each of the actions so that the sum of the adjustment equals the overlap. If at any point the calculated slack becomes negative, the new task is rejected and the calculated slack of the existing nodes is returned to what it was before the insertion.

If the conflict detector module 310 reports that there are no conflicts, then the scheduler module 315 evaluates the predefined behavior patterns 330 to schedule or reserve the resources necessary for the requested tasks to be performed by generating an "action plan" or "planned actions" 325 (see Section 3.3.2) which is basically a temporal instantiation of the corresponding behavior patterns of the corresponding worker node. In performing this task scheduling, the planner module 305 also makes use of the sampler module 320 in order to reserve the appropriate amount of resources to complete the requested task. Note that the scheduler module 315 can also to schedule tasks without requiring an input from the conflict detector module 310.

During operation of tasks, the sampler module 320 provides a statistical analysis of actual resource usage of the various worker nodes in performing particular tasks, and adaptively uses that information to tune resource reservations made by the scheduler module 315 in real-time. Further, prior to actually beginning a task, system level "dry-runs" can be performed to prime the sampler module with statistical resource usage data so that the appropriate amount of resources can be reserved so that any particular task will succeed within some desired confidence level. Similarly, initial estimates or guesses as to the resources needed for a particular task can also be used to prime the sampler module 320.

The behavior patterns 330 generally include information that identifies parameters for tasks that can be performed by each worker node (335, 340 and 345), such as, for example, what sequence of actions is needed, what messages are expected, what types of resources are required for a particular worker node to execute a task, and how much temporal tolerance exists in performing a particular task (for use in determining earliest and latest start times relative to a task deadline). As described in further detail below, in various embodiments, these behavior patterns are either hand authored 355, automatically determined by experimentation 360, or are defined using a software wizard 350, or the like.

3.0 Operation Overview:

The above-described program modules are employed in the "real-time self-tuner" (RTST) for providing automatic programming, scheduling, and real-time control of desired activities/tasks performed by "worker nodes" in an ad-hoc distributed environment as a function of available resources and task criticality. The following sections provide a detailed operational discussion of exemplary methods for implementing the program modules provided above in Section 2.

3.1 Real-Time Self Tuner System Architecture Overview:

In general, distributed tasks communicate through messages and execute service methods on individual worker nodes. The RTST system and method described herein (i.e., the "planner," "instigator," and "worker nodes") exploits similarity in communication patterns and resource needs between similar tasks that exhibit "behavioral patterns." The RTST acts to separate the temporal and spatial behavior and controls execution and scheduling based on the predefined behavior patterns in combination with predicted behavior and resource needs.

Planning is done at an earlier time than actual messaging and communication, thereby facilitating resource planning at an earlier point in time than when task execution by the worker node actually occurs. Data produced by one or more of the worker nodes later drives the actual work, but the planner pre-reserves the necessary resources, thereby assuring that the actual work can be completed successfully. However, due to variations in performing the actual work and random delays, the planner initially over-reserves resources to account for the variations. A statistical model is used to predict exactly how much of the available resources need to be reserved to assure the level of quality a specific task needs. The more critical the application, the higher the required quality is and the more resources it needs.

As noted above, an "instigator" is the application that drives a task to be performed by a worker node. The instigator declares a behavior pattern and the criticality of a task as well as medium dependent tolerance to temporal jitter (e.g., "wiggle room" in the task start time) and the desired deadline when the specific instance of the task should be completed. In general, the planner then instantiates the behavior pattern of a particular worker node (or nodes) into a spatial and temporal plan. Specifically, the planner derives a specific action and resource plan for each worker node that is needed to execute the task (with each task being a particular "instance" of the corresponding behavior pattern). The planner then negotiates the necessary resources with each node, and causes tasks to start at a prescheduled time.

While the task executes, the planner monitors its progress and measures its timing and resource consumption. This monitoring by the planner is generally referred to throughout this description as "sampling." In general, with sampling, one or more of the worker nodes send samples of collected information back to the corresponding planner according to a predetermined sampling schedule. Consequently, as discussed in further detail below, this sampled information is basically a kind of status report that tells the planner information such as actual resources used by a particular worker node, how long the worker node needed to complete the assigned task, etc.

Given this sampled information, the planner adjusts a corresponding statistical model to produce updated predictions on the resource needs for the corresponding worker nodes. If the quality of the measured performance does not match that specified by the application, the planner will attempt to renegotiate the plan with the worker nodes. Commonly the adjustment in reserved resources will be downwards, as the quality of the stochastic distribution of the statistical model itself increases with more samples and thus less over-reservation is needed, thereby freeing up reserved resources for other potential uses.

3.3.1 Behavior Patterns:

In scheduling the tasks to be performed by the worker nodes, the planner evaluates a "behavior pattern" that is defined for each of the worker nodes. In general, these behavior patterns include information that identifies parameters, such as, for example, what sequence of actions is needed, what messages are expected, what types of resources are required for a particular worker node to execute a task, and how much temporal tolerance, or jitter, is acceptable in performing a particular task (for use in determining earliest and latest start times relative to a task deadline).

In various embodiments, these behavior patterns are either hand authored, automatically determined by experimentation, or are defined using a software wizard, or the like, which evaluates individual worker nodes to estimate their behavior (either with or without user input). In general, behavior patterns can be maintained either within some addressable memory within each corresponding node, in an external lookup table, file, or database accessible to the instigators and/or planners, or can be maintained within some memory accessible to the corresponding planner. Operationally, in one embodiment, behavior patterns are declared to the planner by the instigator.

With respect to experimental determination of behavior patterns, the general idea is to perform a "dry run" of particular tasks across the ad-hoc network to determine what resources are actually consumed by the worker nodes in performing those tasks. These dry-runs are preferably performed without actually affecting anything in the real world (audibly playing music, visibly cycling lights, recording data to a memory device, etc.). A simple example of a "dry run" would be to send audio packets, representing one or more audio streams, across a network from a music player to one or more sets of receivers/speakers (without actually audibly playing the music) to determine behaviors such as, for example, how many concurrent audio streams the music player can service at a given audio sampling rate, how much network bandwidth is consumed by the audio packets for each stream, how much bandwidth is available, the maximum data rate that can be handled by the receivers/speakers, etc.

An example of a very rudimentary behavior pattern is illustrated below with respect to FIG. 4, and with a predefined XML-based behavior pattern. In particular, the following XML-based behavior pattern defines three nodes, including a planner 410 (which is also the instigator in this case) a producer note 420 (which is a data sensor, such as a thermocouple, in this example) and a consumer node 430 (which may be a data recorder, in this example).

```
<behavior name="SensorDemo">
    <action name="DemoInstigator" endpoint="node:instigator/COB/
    sensormain.cob">
        <message destination="SensorProducer/*"/>
    </action>
    <action name="SensorProducer" endpoint="node:sensor/COB/
    sensor.cob"/>
        <repeat count="100" Period="P1.5S"/>
        <message destination="SensorConsumer"/>
    </action>
    <action name="SensorConsumer" endpoint="node:consumer/COB/
    sensor.cob"/>
        <repeat count="100" period="P1.5S"/>
    </action>
    <sampling destination="node:instigator" interval="20" number="2"/>
</behavior>
```

Example Behavior Pattern for a Three Node Sensor Demonstration

In general, the example behavior pattern illustrated above expresses a pattern for a sensor demonstration that runs on three nodes (note that in various embodiments, the instigator 400 can be separate from the planner 410, if desired). In this example, the instigator/planner 410 sends an asynchronous message to sensor 420 that is directed to all 100 of the SensorProducer action instances. The sensor producer 420 then runs the method expressed in that message for one hundred times, each run offset by 1.5 seconds. The producer 420 also sends a message each time to the consumer 430, which expects one message per action instance. The consumer 430 then records the data received in the messages sent by the producer 420. Note that the behavior pattern illustrated above also states that sampling (i.e., status reports) should be done at a double sampling schedule every 20 invocations. This sampling is used as feed-back to the statistical model maintained by the planner 410 in scheduling and reserving resources for the producer 420 and consumer 430 in this example.

3.3.2 Planner and Planned Actions:

In general, given the behavior patterns for each worker node, the planner acts to instantiate the behavioral pattern into a spatial and temporal plan given a task that is requested by the instigator. The planner derives a specific action and resource plan for each node that is needed to execute a particular task (with each task being an instance of the corresponding behavior pattern). The planner then negotiates the resources with each node, and orders particular tasks to begin at particular times, relative to the available resources and a predefined criticality of the task.

In planning actions, behavior patterns for a particular worker node are instantiated to a spatial plan by a discovery service. The discovery service resolves action scheduling roles (see Section 3.3.3) into precise URLs and network addresses. Discovery, trust, and security issues in instantiating these tasks are accomplished using conventional techniques to determine what devices are connected to the ad-hoc network, whether those devices are trusted, and what type of security, if any, is to be used.

As noted above, the behavior pattern is instantiated temporally by the planner. The planner uses a stochastic process and sampling (node status reports) to predict how many resources are needed for a given application specified quality standard. The planner then estimates how much time will be needed at each node and how far before a particular task deadline an action needs to start. The planner also offsets the various actions relative to each other so that the overall deadline can be met.

The specific start time is finally calculated from an application supplied overall deadline. This full instantiation of a behavior pattern is now termed an "action plan," which is generally a list of actions with their corresponding locations, resources, and times. The planner then negotiates the resources with the worker nodes, at which time it is up to the application (instigator) to provide the data for the initial message that sets the planed action in motion.

Planned actions express temporal behavior of a program. Action scheduling is a novel extension of conventional earliest deadline first (EDF) and constraint based scheduling (CBS). As noted above, planned actions (or "action plans") are also instantiations of behavior patterns, bound to a specific time and place. For example, the following XML-based example action plan is a plan corresponding to the XML-based behavior pattern described above in Section 3.3.1.

```
<task name="SensorDemo-123456">
    <action name="SensorProducer"
        deadline="2004-12-11T02:51:48.7001508Z" tolerance="P0.005S"
        duration="P0.02S">
        <trigger maxCount="100" offset="P1.5S">SensorProducer</trigger>
    </action>
    <sampling destination="http://10.10.10.10/COB/statistics.cob"
        interval="20" number="2"/>
</task>
```

Action Plan for Producer Node Corresponding to Example Behavior Pattern

In general, action plans list what resources are needed for a task, at what time those resources are needed, where those resources are located, and how much time variance (or jitter) can be tolerated. At any one time and place, the planned action is a multi-dimensional resource vector that enumerates all the various resources needed (CPU cycles, memory, I/O bandwidth, etc.). The planned actions also describe the relationship between related actions through triggers. As noted above, one action can trigger another action or itself, or both.

The planned action model proposed in this paper is an extension of a constraint based scheduler (CBS), which is itself an extension of earliest deadline first (EDF) based scheduling. However, unlike CBS- and EDF-based scheduling wherein each thread declares its constraints, the resource plan described herein is separated from execution.

In particular, the action plan is a constraint with a state machine, where execution is possible only in the right state. Once an action is entered into the local schedule, it reserves the time just like a conventional CBS- or EDF-based constraint. However, unlike a CBS- or EDF-based constraint, a planned action, as described herein, needs more than just the correct time to run. First, as discussed in further detail below, the planned action needs to be triggered, and second, the planned action needs to have something (a continuation) to run associated with it. In other words, what is executed is separated from when something is executed and in which sequence. Therefore, the action's triggers control the sequencing, and the action's deadline controls when. The "what" of the planned action is controlled by the specific implementation of the services and the methods that are called and the specific behavior patterns defined for a particular node/task—in other words, the content of the payload messages.

Consequently, a planned action item is a tuple <Deadline, Estimate, Tolerance, Trigger; SeqNo, State; Consumed>. (Note that in conventional programming languages, a "tuple" is simply an ordered set of values). The Deadline is the same as in EDF and CBS, the Estimate is the same as in CBS, the Tolerance corresponds to the Start time in CBS (Tolerance=Deadline−Estimate−Start) but is a somewhat more meaningful number to applications. The Trigger is a list of actions (if any) to trigger once the current action is completed. The sequence number (SeqNo) distinguishes one instance of a repetitive action from another. Once a worker node has accepted an action, the planner executes a state machine on the action. The state machine includes the following states: Initialize, Wait-Trigger, Wait-Message, Wait-Start-Time, Run, Terminated. The service application gets to execute once the state machine reaches the Run state.

A repetitive action is one that triggers itself with a time offset. A sequence of actions is one where actions trigger each other in a chained fashion. A one-time action is one where there is only one action that does not trigger anything. An action that is not triggered by any action other than itself is considered automatically triggered initially. A trigger can be represented by the tuple: <WhatAction, TimeOffset, RepeatCount>

While actions form scheduling trees in the planner that creates and interprets them, they are represented as simple XML blocks while in transit. These messages are automatically serialized by the planner. An example of a simple serialized planned action is illustrated above (i.e., the "Action Plan for Producer Node Corresponding to Example Behavior Pattern" described above). Again, it should be noted that the use of XML in this detailed description of the RTST is provided for purposes of explanation only, and that the RTST is not intended to be limited to the use of XML or other particular scripting or coding languages.

3.3.3 Action Scheduling Roles:

Scheduling of planned actions is split into three distinct phases:
1. Instantiating a behavior pattern into a concrete action plan by the instigator (planning);
2. Negotiation of the plan with the worker nodes (admission control); and
3. Executing the action plan and state machines on the worker nodes.

The planning (phase No. 1) is done by an instigator (which can also be the "planner," as described above) which drives a specific task. There may be multiple instigators driving multiple instances of multiple tasks. Each task can be planned in isolation and its resource needs can be estimated in isolation. Similarly each node knows how to best execute the work that is delivered to it (phase No. 3). In one embodiment, each node will, within the given constraints, try to execute the schedule in an optimal order, so as to save energy or other resources, if possible.

In one embodiment, the admission control (phase No. 2) is done at the worker nodes themselves, using a "decentralized model." Alternately, this admission control can be done at a central machine (i.e., a central planner or instigator) that knows the schedules for all the nodes/tasks, using a "centralized model." One advantage of the decentralized model is that it works in an ad-hoc peer-to-peer type environment. One advantage of the centralized model is that the central node could be more powerful and have more complete information. Further, a central node can also schedule shared resources such as radio bandwidth and pick the best node to execute a given action when there is a choice. Implementation of the centralized model for admission control is straightforward in view of the following discussion. Consequently, for purposes of explanation, the decentralized model for admission control is described in further detail below.

It is interesting to note the temporal shift in the scheduling in addition to the location differences. In particular, the planning and admission control are done at the time of instigation, when work is initially started (e.g. the TV remote was pressed to start a movie). The execution of the plan, and the local scheduling, is done much later, while the movie is playing, with full knowledge of everything that needs to be done. This allows the local scheduler flexibility as it knows all it needs to do. It can for example attempt to cluster all execution so as to turn itself off for the time in between tasks that it needs to perform. For example, in order to conserve the most energy, an action plan for listening for button presses on a remote control can be used for the most aggressive power savings that will not shut out additional task creation (as a result of pressing a button on the remote). Similar plans can be provided for other spontaneous activities with the expected patterns that follow.

An action plan does not mandate that any execution actually results. It is merely a reservation that guarantees that the resources will be available when needed. The cost of a task thus consists of a reservation cost in addition to the work itself. The reservation cost depends on what other plans were not admitted as a result and depends on the amount of available resources in addition to the degree of inflexibility in plan execution. In other words a plan that requires high confidence and little jitter is more expensive as there is more potential conflict with other plans.

3.3.4 Estimating Resource Consumption of Actions:

The behavior pattern given to the scheduler lists some of the resources that are needed for executing instances of the pattern. Others, in particular CPU and memory, are needed by almost all actions so those can be inferred automatically. However, more requirements can be detected in the sampling phase.

In general, one function of the planner is to estimate overall time for particular tasks. In estimating this overall time, the planner described herein uses a stochastic filter for probabilistically estimating the overall time. In a tested embodiment, the planner stores previous samples (from received status reports) in a table. The planner then calculates a normal distribution of the samples. The planner then integrates this distribution up to the application supplied confidence level (See FIG. 5). In other words, in reserving time, the planner will, based on the probabilistic distribution computed from the received status reports, determine the amount of time (or other resource) required to achieve a desired percentage (i.e., the "confidence level") of successful task completion. Note that this integral is roughly $\log_{10}$ of the confidence, e.g. when going from 99% probability to 99.99% probability the amount of resources needed increases by approximately twice the median.

The integral gives the amount of particular resources (time, bandwidth, CPU cycles, etc.) required to assure the work will be complete within the interval with the given probability (the confidence). The size of the integral depends on: 1) the median; 2) the deviation (volatility) of the measurement; and 3) the quality of the measurement itself. In order to stabilize the estimate, in one embodiment, a negative feedback loop is added. This works by mixing the old median and deviation into the new estimate when new samples replace the old.

As noted above, the planner uses the samples (status reports) to calculate a distribution function. It reserves enough resources to achieve the required quality (confidence). The higher the required quality the more resources are needed. Similarly, the more jitter there is in the measurements the more resources will be reserved. Uncertainty about the distribution itself also adds to the resource requirements. Initially, when there are no measurements, the planner uses application supplied guesses. Further, in one embodiment, a "dry-run," as described above, can also be used to prime the distribution function.

In one embodiment, computational overhead with respect to the probabilistic model is reduced by using pre-calculated values of the integral of the normal distribution and fixed point integer arithmetic to avoid expensive calculations. Once advantage of this pre-computation, with respect to the decentralized model described herein, is that there may be less computing power available in a decentralized ad-hoc network, then in an implementation with a central node (as described above) which has more powerful computational capabilities. If the planning is done in a centralized way, or as a service in its own right on a powerful machine, the statistical calculations can be done using any conventional statistical modeling tool, without worrying too much about computational overhead. However, microcontrollers in worker nodes typically need to keep calculations to a minimum, while pre-calculated values can be a significant saving.

One of the benefits of the stochastic approach is that it works even when information is incomplete. When the quality of information increases the planner is able to make more tight plans but even in the presence of significant uncertainty (like non-real-time nodes) it can still make a plan with confidence.

3.3.5 Quality Control Sampling:

The sampling functionality of the planner measures the time and resources consumed at each invocation on the worker nodes with the help of the operating system. In general, as noted above, samples are sent back to the planner according to a predetermined sampling schedule. By adhering to the schedule, the sampler avoids overwhelming the network and the nodes themselves with excessive sampling messages and keeps the overhead at an acceptable level while still facilitating a sufficient quality control and accurate predictions.

As noted above, the planner integrates the new samples into the distribution function. When it detects a significant enough change, it renegotiates the action plans with the worker nodes and either releases resources for other use or requests more resources for particular tasks, as appropriate.

3.3.6 Scheduling of Action Plans:

Once the planner has instantiated the location and timing of a particular behavior pattern, it negotiates with each required worker node for acquiring a reservation for executing the plan. It sends a task description (i.e., the "Action Plan for Producer Node Corresponding to Example Behavior Pattern" described above in Section 3.3.2) to the worker node using XML-based SOAP. (Again, the RTST is not intended to be limited to the use of either XML or SOAP). The scheduler on each node then performs an admission check and optionally checks for resource usage conflicts. If there are no conflicts (or if the conflict check is not preformed), the task is accepted. Otherwise the task is rejected and the instigator application is notified of the failure. If any of the worker nodes required for a particular task rejects its plan (for example, an audio player can't stream any additional audio streams and still maintain a desired audio sampling rate), the planner cancels the task on all the worker nodes required for that task. At this point the application can take corrective action and attempt to reschedule at another time. If instead the plan is accepted on all nodes, control is returned to the instigator application for making the initial method call that results in the first message being sent that in turn puts the plan into action.

Note that in one embodiment, the initial method message to the worker node can be piggybacked with the initial reservation request. Then, if the reservation fails, the method message is simply ignored. One advantage of this embodiment is that this piggybacking saves one communications roundtrip, as the success of the method message implies the acceptance of the task.

Each node keeps a list of all accepted tasks. When a new task is proposed or an old one is adjusted, the local scheduler on the planner runs an admission check and optionally determines whether there are conflicts (via the aforementioned conflict detector). This is essentially a conventional bin-pack problem with many known solutions [Knuth, MP-scheduling, nurses, etc.], any of which can be used in various embodiments. However, the problem is also NP-complete, meaning that a precise answer is not feasible. Therefore, in a tested embodiment, a simple best effort algorithm that sometimes produces false positives was found to provide acceptable results.

The conflict detector first attempts to determine conflicts against any repetitive actions and then attempts to fill in one-time tasks into the gaps. The algorithm uses a calculated slack that is initially set to the jitter tolerance given by the application. It then compares the new task against one other task at a time. When a potential overlap is detected (the period and time estimate interfere at any point in time) the calculated slack between the two tasks is adjusted by reducing some slack from each of the actions so that the sum of the adjustment equals the overlap. If at any point the calculated slack becomes negative, the new task is rejected and the calculated slack of the existing nodes is returned to what it was before the insertion.

In essence the admission check is a tree merge of two scheduling trees, if the merge fails the admission is rejected. Further, the tree merge is location independent as long as there is a single authority (i.e., one planner). Thus in a centralized scheduling system the authoritative scheduler will simply deliver the current tree to the worker node.

The worker node uses the scheduling action tree to drive the timing of actual task execution. A low-level scheduler handles context switching, priority inheritance and similar short-term issues.

One big advantage of having pre-declared long-term scheduling plans is that the scheduler can know when execution is not expected (i.e., "idle gaps"). Consequently, in one embodiment, the scheduler uses this information to shut off the power during those times when execution is not expected. In addition the scheduler can attempt to make those idle gaps as large as possible by packing the schedule in such a way that expected execution is clustered together. Thus, when the system is powered up it can do as much as possible and then stay powered down for extended periods of time.

In the presence of multiple instigators, the admission control and negotiation mechanisms are exactly the same. The admission checker simply handles one request at a time.

3.3.7 Continuations and Messages:

When a program executes in a thread, method calls are made on the thread's stack. A method call is represented by a "continuation," which consists of a stack frame—the closure of the call arguments, the object that is being called, the method that is being called, and where to return once the call completes. In general, these continuations are first class objects and can, in one embodiment, exist without the thread, including its full stack. A continuation thus represents either a client side method call that is waiting for the call to complete or the server side call that is to be executed. Further, by separating the continuation into a separate object, a continuation needs an associated thread and stack only while the continuation actually executes. Consequently, this enables significant memory savings on continuations that are not currently executing. This embodiment is particularly useful for decentralized ad-hoc networks where memory resources may be scarce.

In one embodiment, a table driven serializer and deserializer (for encoding/decoding the action plans) operate on continuations. The (de)serializer uses a compact metadata representation to interpret continuation fields. They translate between the continuation and a message of a given format. In the case of a SOAP implementation, a message is represented in XML using rules specific to SOAP. There is no code specific to a given interface, except an automatically generated proxy object on the client, which provides transparent methods that simply call the generic interpreter with the method's descriptor and stack frame pointer as arguments. This runtime generated specific code is typically only three to four words depending on the processor instruction set.

The metadata descriptor table is a compressed binary representation of the schemas of known interfaces and the messages that are part of the interface for a particular device. The descriptor can be generated at runtime from XML but is normally compiled offline so that it can be placed in ROM. Further, the metadata can be extended at runtime (sometimes called reflection) but the metadata loaded at runtime must be placed in RAM, which is a usually a scarcer resource.

On the client side, the thread that made a method call waits for its continuation to complete. On the server side, however, there does not need to be a thread a priori. Instead the system creates and recycles threads automatically when the continuation is ready to execute. The stack frame contained in the continuation can simply be copied into a thread stack and registers and it is ready to go. When the method call returns, the service thread returns and does the necessary post-processing, including sending reply messages.

A method call on the server can be thought of as a filter that takes in one message and produces another. An asynchronous method call is simply one that does not produce a reply message. The server recognizes this from the metadata and simply will not send a reply when not desired. On the client side asynchronous messages are similarly not waited for.

Continuations that represent asynchronous messages can be executed multiple times. The corresponding stack frame is simply copied multiple times to multiple threads for execution.

3.3.8 Interaction between Method Messages and Planned Actions:

In an XML-based SOAP implementation of the RTST, each method message carries with it a SOAP header that names the object the message is directed towards, and an action identifier that allows the message to be matched with a particular action. This "rendezvous mechanism" ties the actions and messages back together after they were temporally separated, as described above.

An action id contains the name of the task, the name of the specific action, and optionally a sequence number. The sequence number identifies which specific instance of a repetitive action the message is targeted to. Missed sequence numbers can be dealt with in an application specific way. In a tested embodiment, a missing sequence number was interpreted as the next one that was expected. The sequence number can also be a wildcard. In this case the message is targeted to all instances of the repetitive action. The method is called over and over again with the same parameters, for as many times, and at the time the action specifies. The limitation is that wild carded method calls must be asynchronous as otherwise the client would receive multiple replies in an unexpected way. In a tested embodiment, this limitation is enforced and a SOAP Fault message is sent like in other SOAP failure cases.

A repetitive single message captures the spontaneous method concept into the same abstraction as event driven service methods. A repetitive action together with an asynchronous method message creates a spontaneous, time driven method. In other words, this acts as a "wild-card trigger" for repetitive actions.

Figure 4:
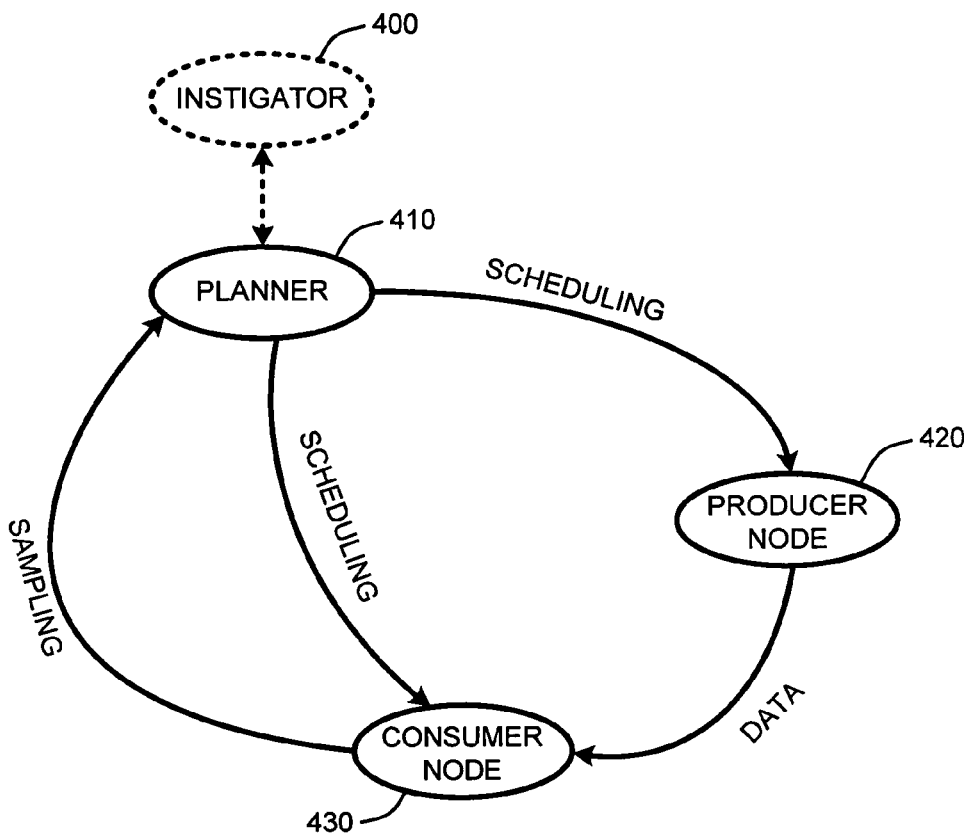
FIG. 4 illustrates an exemplary ad-hoc network showing two worker nodes (a producer node and a consumer node) under the scheduling control of a planner (and optional separate instigator).
Figure 5:
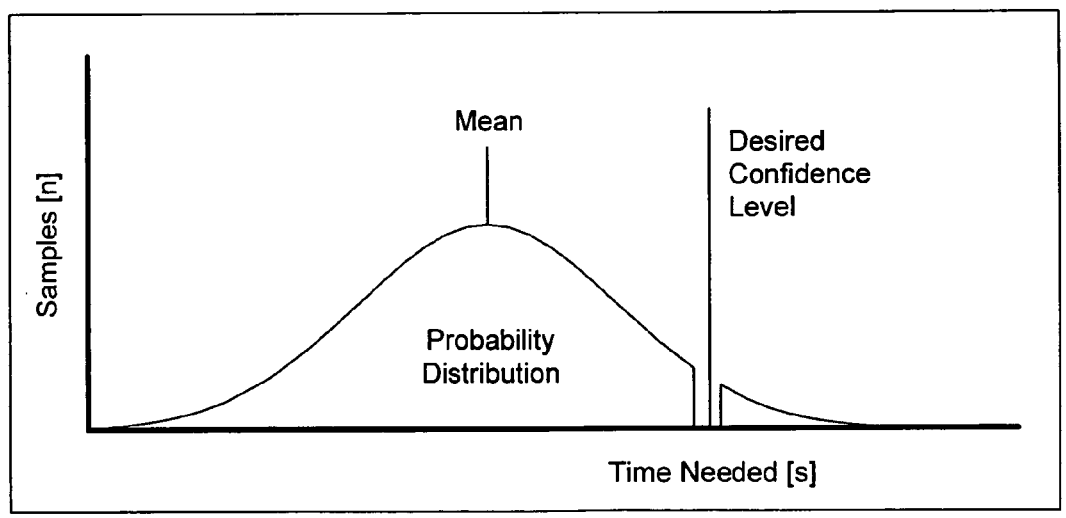
FIG. 5 illustrates a probabilistic distribution computed from the received status reports for determining an estimated amount of resources required to achieve a desired confidence in completing an assigned task.

4.0 Operational Implementation of the RTST:

As noted above, the program modules described in Section 2.0 with reference to FIGS. 3, 4 and 5, are employed enable a "real-time self-tuner" (RTST) for providing automatic programming, scheduling, and real-time control of desired activities/tasks performed by "worker nodes" in an ad-hoc distributed environment as a function of available resources and task criticality. An example of a very simple wireless ad-hoc network upon which the RTST may be implemented is provided in FIG. 6. In general, FIG. 6 illustrates an ad-hoc distributed network comprised of a plurality of variously interconnected computationally enabled devices. Each of these devices (worker nodes) is in contact with one or more planners, which itself may be in contact with an instigator, other planners, or other networks. Further, each of the worker nodes may be in contact with one or more other worker nodes, as shown.

In a tested embodiment, the RTST described herein is constructed of a number of software components written in C. (Again, the use of particular programming or scripting languages is provided for purposes of explanation only, and is not intended to limit the use of the RTST to the particular programming or scripting languages disclosed). Each component of the RTST has a well defined interface that defines how it interacts with other components. Further, all of the components are designed to be compiled to a large number of microprocessors, microcontrollers, VLIW signal processors, etc. In various embodiments, some components, such as conventional AES encryption, have also been implemented on FPGAs.

While the system can be run on bare metal, with the help of conventional real-time operating system "RTOS" components, the RTST can also be run on any of a number of conventional operating systems, such as, for example, Microsoft™ Windows XP™. In general, the RTOS provides precise low-level scheduling as well as avoidance of priority inversion and starvation gaps that are needed for precise real-time operations. When the RTST is run on other (non real-time) systems, the timing can, however, be expected to be less precise.

In general, the RTOS components used by the RTST include a TCP/IP network stack, a constraint based real-time scheduler, a component manager, a dynamic memory manager, synchronization (threads, conditions, mutexes), and device drivers. The RTST uses additional components, including a tokenizer, an XML parser, SOAP serializer, discovery, addressing, key exchange and trust manager and encryption, and adds new components, including an action scheduler and continuation manager, a stochastic planner, and sampling.

4.1 Tokenizer and Parser:

When a network driver receives data, it puts the data into a memory buffer. The buffer is handed to the network stack, which once it has determined the data is a valid packet on a supported transport; it hands off the buffer to the RTST. This happens through a new socket API that sets rules on how buffers are shared and reference counted. The RTST then deals with HTTP headers, if that is the transport, or goes directly to the presentation level XML processor if the transport is UDP or other protocol that was completely handled by the network stack—after optionally decrypting the message.

In one embodiment, the XML is processed in a push model directly from the network buffer as data is arriving and does not create any intermediate parse trees so as to minimize memory consumption. The parser delivers conventional "SAX" ("Simple API for XML") style parsing events to the deserializer.

In the case of outgoing messages the same interfaces are used but the RTST object implementation produces messages rather than consuming them. The reuse of interfaces allows easily plugging in different transports, encodings, and encryption modules as desired. Conventional zero-copy was used in a tested embodiment.

4.2 Serializer and Deserializer:

The deserializer consumes parsing events and matches the incoming data with a metadata descriptor table that is a compact representation of all the interfaces, messages, and fields that the RTST understands. The metadata is generated from an XML system description. The same description also generates a reference manual, C and C++ headers, stub implementations of the service, etc. The incoming messages are then converted into continuations with native stack frames and data representation. A temporary heap is associated with each continuation for storing the argument data. Then, when the continuation is eventually deleted, all the data gets deleted at once.

The parser understands a wide variety of data types, lists, trees of structures, in-out arguments, and language representations of multiple compilers. The outgoing messages are again processed in reverse and the same metadata is used.

4.3 Action Scheduler and Continuation Manager:

When a message contains a SOAP header with an action plan, the scheduler compares the new task with existing tasks. It uses the estimates, deadline, tolerance, and repetition with a slack reduction algorithm to make the determination. A tested embodiment of the RTST implemented a trust manager, using conventional techniques, which can determine whether a particular requestor is trusted at all. In one simple embodiment, the first instigator/planner to reserve an acceptable plan will get the resources. However, in further embodiments, a priority-based economic model is used for determining how much resources should be dedicated to a particular instigator/planner.

Once an action plan has been entered, it will hold the resources it needs reserved until: 1) the plan is modified or cancelled; 2) the work is completed; or 3) the action is not started in time (its method message arrives late or does not arrive).

When a method message arrives, it contains the action ID in a SOAP header. It is a simple lookup to find the correct action from the schedule. A continuation is created and associated with the action. Once the aforementioned trigger driven state machine makes the action run-able (it might be already), the RTST creates a thread to execute the continuation. It creates the thread in a suspended state, copies the stack frame from the continuation, and sets the link register to point to an activation completion routine. It then uses the scheduling information in the action to set a time constraint for the new thread and makes it run. This way, a conventional constraint scheduler can be used to handle the low-level scheduling work (but not the statistical-based resource scheduling provided by the planner).

Once the method call completes on the activation thread, it returns to the server and uses the serializer to send a reply message to the appropriate place. The receiver of the reply message treats it like a service call, so the same code is used. The only difference on a client is that a pre-existing continuation with a pre-existing thread is used. The reply message carries the continuation ID in its SOAP header.

After the reply message is sent, any defined triggers are triggered and resource consumption is determined. An action's trigger list is walked and the state machine of any named action is advanced and associated continuations executed. Note that in a tested embodiment, triggers were only allowed within a single task within a single node. However, it is possible to implement multi-node triggers. Meanwhile the low-level scheduler keeps track of resource use and that information is propagated to the sampler/statistics module that will, according to the sampling schedule, send the resource and timing information to the instigator/planner for quality control and adaptation use.

The network stack uses its own time reservations that are excluded from application use. It is worth noting that there are no starvation gaps between the network stack and the final transmission of the reply message. Deadline driven execution is done at all points and the service thread atomically receives the time constraint from the action plan. The low-level scheduler handles priority inheritance so multiple threads do not starve each other.

4.4 Sampling and Statistics:

As described above, the planner receives quality control sampling information from one or more of the worker nodes. The planner keeps track of all the action plans (tasks) that it has instigated. The sampling messages contain the action ID and the resource and timing information. For each task, the planner maintains a stochastic distribution function. It integrates the new samples into the distribution but uses a negative feedback loop to maintain stability. In a tested embodiment, the samples were maintained as a simple array of a fixed number of samples, however, it should be clear that other conventional methods for maintaining samples and statistical information may also be used in alternate embodiments. A median is calculated and for each sample a standard deviation is calculated. In one embodiment, a negative feedback loop is achieved by inserting a number of old <median, variance> pairs into the array to maintain stability of the statistical computations.

The sampler/statistics module assumes the distribution is a normal distribution. This simplifying assumption might be incorrect in some applications, and other more sophisticated conventional statistical techniques could be used. However, measurements of tested embodiments indicate that the use of a simple distribution yields fairly good predictions.

As explained above, the confidence interval is calculated by integrating the distribution up to the desired application specified probability. Since the distribution is a normal distribution, the integral is independent of the samples and, therefore, in one embodiment, it is pre-calculated offline into another array to minimize computational load on the system.

This pre-calculated integral is then simply scaled to the observed distribution using the observed median and deviation.

4.5 Planner:

As explained in greater detail above, the planner is used to drive and monitor a particular task. The planner maintains a list of known behavior patterns, which can be extended. The planner also keeps track of all tasks (instances of the pattern) that it has orchestrated. It creates the tasks upon application request by instantiating all the unknowns in a pattern. A discovery process is used to resolve node references into transport addresses. The sampler/statistics module (e.g., the "sampler module" of FIG. 3) is used to cache temporal information. On the very first run the temporal information can be provided by the application or come from a modeling tool. Alternatively the planner will use a guess, an overly large estimate that later is adapted and shrunk to reality based on observations provided via sampling. As described above, when the initial uncertainty is expected to cause problems, the application service can implement a "dry-run," where all the work is done without actually affecting anything.

The planner periodically scans the task list to make sure that sampling messages have been received correctly—otherwise the RTST is alerted that the service is misbehaving. The planner also periodically checks whether any tasks' plans need to be adjusted or reservations renewed in view of the information provided via sampling.

Finally, the planner negotiates with worker nodes to reserve the resources needed by a plan. If any necessary resources are not available, the application is notified so it can take evasive action.

The foregoing description of the RTST has been presented for the purposes of illustration and description. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Clearly, many modifications and variations are possible in light of the above teaching. Finally, it should be noted that any or all of the aforementioned embodiments may be used in any combination desired to form additional hybrid embodiments of the RTST described herein.

What is claimed is:

1. A system including a plurality of computing devices connected via an ad-hoc network environment for dynamic real-time scheduling of tasks to be performed by one or more of the plurality of computing devices, comprising using the plurality of computing devices to perform steps for:

for each of the plurality of computing devices connected via an ad-hoc network environment, evaluating behavior patterns defined for each computing device associated with any task requested to be performed by those devices to predict nominal resource requirements for any corresponding task;

wherein the behavior patterns for each device include one or more of a sequence of actions for allowing each device to perform one or more particular tasks, expected message types for controlling device actions, expected resources to be used by each device to execute any particular tasks, and an amount of acceptable temporal tolerance in task start times;

statistically modeling the predicted resource requirements for any of the devices associated with any requested task as a function of the behavior patterns and samples of actual current resource usage on an ongoing basis prior to and during task execution;

evaluating potential resource usage conflict information between the requested tasks;

eliminating potential overlaps in resource usage between tasks by automatically adjusting task execution times relative to the acceptable temporal tolerance in task start times; and dynamically scheduling the requested tasks and reserving resources for those requested tasks on an ongoing basis prior to and during task execution as a function of the statistically modeled current resource usage, the resource usage conflict information, and the defined behavior patterns for each of the devices associated with any task.

2. The system of claim 1 wherein behavior patterns are automatically defined for one or more of the devices connected via the ad-hoc network environment, and wherein defining those behavior patterns comprises steps for automatically performing task dry-runs prior to an actual task execution time to determine nominal resource usage for each device associated with each particular task.

3. The system of claim 1 wherein statistically modeling predicted resource requirements for any device associated with any requested task comprises steps for:

computing a probabilistic distribution of resource usage from status reports provided by one or more devices associated with each task; and determining an estimated amount of resources required to achieve a desired confidence in completing requested tasks as a function of the computed probability distribution.

4. The system of claim 1 wherein evaluating potential resource usage conflicts between all of the requested tasks comprises steps for:

determining whether a requested task conflicts with an already scheduled task, including any ongoing repetitive actions and any one-time tasks; and determining whether all of the devices associated with any requested task are capable of performing the requested task prior to a task completion deadline.

5. The system of claim 1 wherein dynamically scheduling the requested tasks further comprises steps for:

instantiating the behavior pattern associated with each corresponding device into corresponding action plans;

negotiating the action plans with the corresponding devices to identify temporal constraints on task execution; and ordering the execution of each action plan in accordance with the temporal constraints of each action plan.

6. The system of claim 1 wherein statistically modeling predicted resource requirements further comprises steps for applying a negative feedback loop into statistical modeling computations by including prior median and variance values in the computation of predicted resource requirements for maintaining stability of the statistical computations.

7. A method for dynamically scheduling execution of requested tasks to be performed by a plurality of computing devices variously interconnected in a network environment, comprising:

for each of a plurality of computing devices connected via an ad-hoc network environment, defining nominal behavior patterns for each of a plurality of computing devices relative to one or more particular tasks;

wherein the behavior patterns for each device include one or more of a sequence of actions for allowing each device to perform one or more particular tasks, expected message types for controlling device actions, expected resources to be used by each device to execute any particular tasks, and an amount of acceptable temporal tolerance in task start times;

probabilistically modeling expected resource usage on an ongoing basis prior to and during task execution for any device associated with any particular task by evaluating samples of actual resource usage in combination with the nominal behavior patterns defined for each of the corresponding computing devices;

evaluating potential resource usage conflicts between each of a plurality of requested tasks;

eliminating potential overlaps in resource usage between tasks by automatically adjusting task execution times relative to the acceptable temporal tolerance in task start times; and dynamically scheduling the requested tasks and allocation of resources for each of those tasks on an ongoing basis prior to and during task execution as a function of the probabilistically modeled resource usage, the evaluation of potential resource usage conflicts and the defined nominal behaviors for each corresponding computing device.

8. The method of claim 7 wherein defining the behavior patterns comprises automatically performing task dry-runs prior to an actual task execution time to determine nominal resource usage for each device associated with each particular task.

9. The method of claim 7 wherein probabilistically modeling expected resource usage for each device comprises determining an estimated amount of resources required to achieve a desired confidence level in successful completion of a requested task.

10. The method of claim 7 wherein evaluating potential resource usage conflicts comprises determining whether all devices associated with any requested task are capable of performing the requested task given currently available resources prior to a task completion deadline without interfering with another already scheduled task.

11. The method of claim 10 wherein dynamically scheduling the requested tasks and allocation of resources further comprises, for non-conflicting tasks:
    instantiating the nominal behavior pattern defined for each corresponding device into a corresponding action plan;
    negotiating the action plans with the corresponding devices to identify temporal constraints on task execution times; and
    ordering the execution of each action plan in accordance with the temporal constraints of each action plan.

12. A computer storage having computer-executable instructions stored thereon for dynamic real-time scheduling of tasks performed by any one or more of a plurality of computing devices in an ad-hoc network environment, said computer executable instructions comprising:
    for each of a plurality of computing devices connected via an ad-hoc network environment, defining a task-specific behavior pattern for each computing device, said behavior pattern describing specific actions that will be performed by each device for execution of the corresponding task;
    wherein the behavior patterns for each device include one or more of a sequence of actions for allowing each device to perform one or more particular tasks, expected message types for controlling device actions, expected resources to be used by each device to execute any particular tasks, and an amount of acceptable temporal tolerance in task start times;
    statistically modeling predicted resource usage requirements for each device for each corresponding task as a function of the corresponding behavior patterns on an ongoing basis prior to and during task execution;
    evaluating potential resource usage conflicts between each requested task as a function of desired task completion times for each requested task;
    eliminating potential conflicts in resource usage between tasks by automatically adjusting task execution times relative to the acceptable temporal tolerance in task start times; and
    dynamically scheduling the requested tasks and reserving resources for those requested tasks on an ongoing basis prior to and during task execution as a function of the statistically modeled predicted resource usage, the evaluation of potential resource usage conflicts, and the defined behavior patterns for each device associated with any task.

13. The computer storage of claim 12 wherein statistically modeling predicted resource usage requirements for each device further comprises evaluating samples of actual resource usage by each device for each corresponding task.

14. The computer storage of claim 12 wherein statistically modeling predicted resource usage requirements for each device for each corresponding task further comprises performing task dry-runs as a function of the behavior patterns of the corresponding devices prior to an actual task execution time to determine nominal resource usage for each device associated with each particular task.

15. The computer storage of claim 14 wherein statistically modeling predicted resource requirements for each device further comprises computing a probabilistic distribution of resource usage from one or more status reports provided by one or more of the devices associated with each task for determining an estimated amount of resources required to achieve a desired confidence in successful task execution.

* * * * *